United States Patent Office 3,111,360
Patented Nov. 19, 1963

3,111,360
FIBERS FORMED FROM BLEND OF POLYMER OF MONOVINYL AROMATIC COMPOUND AND POLYMER OF ALKENYL HALIDE
Fabian T. Fang, Levittown, Pa., assignor to Rohm & Haas Company, Philadelphia, Pa., a corporation of Delaware
No Drawing. Filed Oct. 16, 1959, Ser. No. 846,778
9 Claims. (Cl. 8—115.5)

The present invention is concerned with the production of filaments and fibers comprising polymers oriented longitudinally of the axis of the fibers therein. The invention is particularly concerned with artificial fibers formed of polymerized monovinyl aromatic compounds. More particularly, the invention is concerned with fibers of polymerized monovinyl aromatic compounds stabilized against shrinkage on heating. The invention is also concerned with the production of ion-exchange fibers formed of sulfonated vinyl aromatic compounds which are not subject to excessive swelling or shrinking in aqueous media.

In accordance with the present invention, the fiber is formed from a blend of (A) a polymer of a monovinyl aromatic compound, the aromatic nucleus of which has at least two substitutable positions, with (B) a linear polymer of an alkenyl halide or of a linear aliphatic polyene compound or of a mixture of an alkenyl halide with a linear aliphatic polyene compound. The $T_i$ of the blend should be at least 20° C. and it may be from 20° to 100° C. or more. The $T_i$ value referred to is the apparent second order transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

Component (A) may be a homopolymer of a compound having the formula

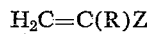

$$H_2C=C(R)Z$$

wherein R is hydrogen or an alkyl group advantageously of less than 3 carbon atoms and Z is an aryl group which has positions on an aromatic nucleus available for substitution. The formula includes vinyl aryls, such as styrene, vinyl naphthalene, vinyl diphenyl, vinyl fluorene, etc., and their nuclear-substituted derivatives, such as alkyl, aryl, alkaryl, aralkyl, cycloalkyl, alkoxy, aryloxy, chloro, fluoro, chloromethyl, fluoromethyl, and trifluoromethyl nuclear derivatives, for example, methyl-styrenes, e.g., o-, m-, and p-methyl-styrenes, o-, m- and p-ethyl-styrenes, isopropyl-styrenes, tolyl-styrenes, benzyl-styrenes, cyclohexyl-styrenes, methoxy-styrenes, phenoxy-styrenes, o-, m- and p-chloro-styrenes, o-, m-, and p-fluorostyrenes, chloromethyl-styrenes, fluoromethyl-styrenes, trifluoromethyl-styrenes, vinyl-methyl-naphthalenes, vinyl-ethyl-naphthalenes, vinyl-chloro-naphthalenes, vinyl-methyl-chloro-naphthalenes, etc. The polymerizable monomers which can be used advantageously with ionic type catalysts include aromatic compounds having a vinyl group containing an alkyl group in its alpha-position, e.g., isopropenyl or alpha-methyl-vinyl, alpha-ethyl-vinyl, alpha-propyl-vinyl, etc. Such alpha-alkyl-vinyl groups may be substituted on benzene, naphthalene, diphenyl, fluorene nuclei etc., and may have other substituents on the aromatic nuclei as illustrated above for the vinyl aryl compounds.

The alkenyl halide that may be employed for making component (B) which may be a homopolymer includes methyl chloride, allyl chloride, 2,3-dichloro-propene-1, crotyl chloride, vinyl chloride, vinylidene chloride, 1-chloro-1-fluoro-ethylene, and 4-chlorobutene-1, pentenyl-chlorides. Examples of polyenes which may be used for making component (B) are butadiene-1,3; isoprene or 2-methyl-butadiene-1,3; 2,3-dimethyl-butadiene-1,3; 2-methyl-pentadiene-1,3; hexatriene-1,3,5; myrcene; ocimene; allo-ocimene, etc., and certain substituted aliphatic polyenes such as chloro, fluoro, and aryl derivatives, e.g., chloroprene or 2-chloro-butadiene-1,3; fluoroprene or 2-fluoro-butadiene-1,3; and 1-phenyl-butadiene-1,3.

The polymer of component (A) may be a copolymer of one or more of the monovinyl aromatic compounds above. Also the polymer of component (A) may comprise up to 15% by weight of a non-aromatic compound copolymerized therein. Examples of such non-aromatic compounds include isobutylene, ethylene, vinyl acetate, acrylonitrile, methyl methacrylate, ethyl acrylate, or other acrylic esters.

Component (B) may comprise copolymers of an alkenyl halide or of a polyene or of both with up to 90% by weight of one of the aromatic compounds mentioned hereinabove or it may include up to 15% by weight of any other type of comonomer such as isobutylene, ethylene, vinyl acetate, acrylonitrile, methyl methacrylate, ethyl acrylate, or other acrylic esters.

The polymers making up components (A) and (B) may have any molecular weight from 10,000 up to 10,000,000. However, it is preferred to employ polymers having molecular weight of 300,000 or higher. The polymers or copolymers may be produced by any suitable polymerization system, such as bulk, solution, emulsion, or suspension. Component (A) and component (B) may be mixed or blended by mixing molten masses of the two polymer components, by mixing polymer solutions, or by mixing the aqueous dispersions obtained by emulsion polymerization.

The proportion of component (B) in the blended copolmer mass formed of (A) and (B) is such as to provide an amount of alkenyl halide or of polyene units between about 2 and 30% by weight of the entire polymer weight in the blended polymer mass. Preferably, the amount of alkenyl halide or polyene units or of a mixture thereof is in the range of 5 to 20% by weight of the polymerized mass making up the blend.

The blended polymers may be formed into fibers in any suitable way such as by extruding a molten mixture into an atmosphere having a controlled temperature and especially a temperature substantially below the melting point of the mixture.

The fibers may be formed by extruding solutions of the polymer blend in an organic solvent or mixture thereof into a coagulating medium which may be a heated or cooled atmosphere in the case of a dry spinning system, or a liquid coagulating bath in the case of a wet spinning system. An aqueous dispersion of a blend of emulsion polymers may likewise be spun in either a dry or wet spinning system. In a wet spinning system, the coagulating bath is composed of a liquid medium which is not a solvent for the polymer blend but is a solvent for the solvent that is used in making the solution of the polymer that is spun. In the spinning operation by dry or wet spinning, the polymer blend is subjected to an operation for effecting complete coalescence. This may involve simply the maintenance of a sufficiently high temperature in the coagulating media or it may involve a separate step thereafter in which the partially coalesced polymer blend is completely coalesced by heat. The temperature for this purpose may be from 60° to 400° C. depending upon the particular polymer blend to be coalesced.

After coalescence of the polymer blend into the fiber form, it is desirable to subject the filament or fiber to stretching. The stretching may be from 50% to several thousand percent of the initial length obtained after coalescence. This stretching may be facilitated by carrying it out on the filaments while subjected to a temperature in the range of 40° to 120° C.

After stretching, the filaments may be converted into various textile or industrial fabric structures. This may involve assembly of a large multiplicity thereof into the form of an untwisted tow, the assembly of a multiplicity of the filaments into a twisted yarn, the doubling of several yarns of the filaments into a thread, cord, or the like, the formation of the fabrics from the yarns by interlocking thereof as by weaving, knitting, netting, knotting, or braiding, or the formation of felted or nonwoven fabrics.

The artificial fibers or filaments, after stretching and either before or after conversion into any of the fabricated structures just mentioned, are stabilized by reacting polymer (A) with polymer (B) in the blend. This reaction involves cross-linking by an alkylation of polymer (A) by the alkenyl halide or the polyene units in polymer (B). This alkylation cross-linking action may be effected by the use of Lewis acids or Friedel-Crafts catalysts such as aluminum chloride, ferric chloride, stannic chloride, titanium chloride, the corresponding bromides such as aluminum bromide and so forth, and boron trifluoride, especially its complexes such as with ethyl ether. Instead of the catalysts just mentioned, the alkylation can be effected simply by treatment with strong acids such as sulfuric acid, phosphoric acid, chlorosulfonic acid, alkyl or aromatic sulfonic acids such as o- or p-toluenesulfonic acid, or methanesulfonic acid, and polyphosphoric acid.

The treatment with the Lewis acid catalysts may be effected in solvents such as nitromethane when such catalysts are of solid character; but when the liquid form such as the boron trifluoride ethyl ether complex is employed, no solvent need be used though if desired, a suitable solvent may be employed. In this procedure of operation, when a solvent is employed, the tendency of the fibers to shrink in the solvent can be substantially completely prevented by employing the Lewis acid catalyst at a very high concentration therein or if desired, by holding the fibers under tension during treatment. The necessity to hold the fibers under tension is practically eliminated when concentrations of the catalyst in the neighborhood of 1 molar or higher are used.

The temperature of treatment may range from about 0° C. to about 100° C. when the Lewis acid catalyst is employed. In general, the time of treatment varies inversely with the temperature and it may range from about 1 to 5 minutes to 2 hours at the higher temperature above and 1 to 72 hours at the lower temperature. The treatment can be allowed to proceed for longer times than specified.

In the case of employing strong acids, such as the commercial 96% by weight, sulfuric acid, temperatures may range from about 0° to 35° C. In the case of sulfuric acid, the concentration may vary from 70 to 103%. The time of treatment may vary from about 1 to 72 hours at about 20° C. depending upon the denier of the fiber, the finer the fiber the shorter the time needed to provide effective cross-linking and stabilization. At 0° C. a minimum period of about 2 hours is generally needed to effect adequate cross-linking. Temperatures higher than 35° C. should be avoided since above that temperature sulfonation is favored which leads to swelling and dissolution of the fiber before cross-linking is adequately performed. With proper control of the temperature to prevent too rapid sulfonation, the treatment may be allowed to proceed for 3 or 4 days without causing shrinkage or dissolution of the fiber during the treatment.

The alkylation may be effected by the employment of any of the other strong acids mentioned at relatively high concentrations in aqueous media. Concentrations of 70 to 98% may be used.

In general, the same range of temperature may be employed as in the case of sulfuric acid. Similar time periods are generally applicable as well.

Termination of the alkylation treatment may be effected by immersion or rinsing in water. If desired, the first rinsing may be effected with a less concentrated solution of the acid employed during the alkylation and such rinsing may be carried out in successive stages of increasing dilution followed finally with one or more rinses in water.

After the alkylation just described by which the artificial fiber is stabilized against shrinkage, it is subjected to a sulfonation reaction. This can be a continuation of the alkylation treatment when that is done by means of sulfuric acid or one of the strong sulfonic acids mentioned hereinabove and such continuation may be carried out at temperatures of from about 20° C. up to about 100° C.

If desired, the sulfonation may involve the addition of a more strongly acting sulfonating agent than the sulfuric acid employed during the cross-linking stage. Thus, oleum may be added to the sulfuric acid bath in stages. This extended sulfonation may be carried out at room temperature or up to 100° C. or even as low as 0° C. The time depends upon the temperature and the particular sulfonating agent. Chlorosulfonic acid is extremely rapid in its action even at 0° C. When sulfur trioxide is employed as a sulfonating agent, a solvent such as dioxane may be employed.

The extended treatment with sulfuric acid or fuming sulfuric acid may be accelerated by the employment of catalysts such as silver sulfate.

When the alkylation is effected by means of a Lewis acid or of a phosphoric acid or other strong acid other than a sulfonating type, it is merely necessary to add a sulfonating agent with or without such a catalyst as silver sulfate to the cross-linking bath to effect the sulfonation.

When the desired extent of sulfonation has been effected, the fibers or fibrous product is removed from the sulfonating bath and washed or rinsed. This may desirably be effected by treatment with one or more increasingly dilute sulfuric acid or other sulfonating acid solutions in water. Then, the treated fabric may be finally washed and if desired, neutralized in an aqueous alkaline solution.

By the procedure of the present invention, ion-exchange fibers and fabrics of many types may be obtained which are highly sulfonated and useful for ion-exchange purposes in well-known ways and yet are not subject to excessive swelling or shrinkage in aqueous media during use as ion-exchangers. They may be made into endless belts for use in continuous ion-exchange systems. The extent of sulfonation may be anywhere from 0.1 to 3 sulfonic acid groups per aromatic nucleus. Preferred products generally contain an average of about one sulfonic acid group per aromatic nucleus. The ion-exchange capacity may range from about 0.5 milliequivalent per gram to 6 or more milliequivalents per gram. Preferred products have ion-exchange capacity from 3 to 5 milliequivalents per gram.

In the following examples, the parts and percentages are by weight unless otherwise indicated.

The following Example A is a typical procedure by which stretched fibers of the polymer blend adapted to be converted into the stabilized, sulfonated products of the present invention may be made.

*Example A*

Two emulsion polymers are prepared in aqueous dispersions using 3% potassium laurate based on solids in each case, the first being polystyrene and the second polybutadiene both at 40% polymer solids by weight. The two dispersions are blended in an 85:15 styrene-to-butadiene-weight ratio and 5% toluene based on polystyrene solids is gradually added with stirring. The dispersion blend is forced through a platinum-alloy spinneret into a coagulating bath. The spinneret has a face diameter of 0.5 inch and contains 120 holes each of 0.0025 inch diameter. The coagulating bath is an aqueous 30% hydrochloric acid solution also containing 0.5% p-diisobutylphenoxyethoxyethyl dimethyl benzyl ammonium chloride and is maintained at 85° C. The bundle of filaments formed is drawn through the bath at a rate of about eleven meters per minute. The immersion path is four inches. The yarn is washed on a roll immersed in a trough fed by fresh water and equipped with an overflow pipe. The yarn is then dried by passing it over two canted heated drums revolving at a speed providing a linear peripheral rate of about 11 meters per minute. The temperature of the drums is 230° C. The yarn is then passed over rolls operating at differential speeds to stretch the yarn about 400%. The first of these two rolls is heated to about 120° C. The stretched yarn is collected on a bobbin winder. It has a denier of about 250, a tenacity of 0.9 gram per denier, and an extensibility of 25% at break.

The following examples illustrate the production of cross-linked, sulfonated fibers or filaments of the present invention.

*Example 1*

A skein of yarn formed of continuous filaments (250 denier, 120 filaments) of a blend of 85 parts of polystyrene and 15 parts of polybutadiene which had been stretched about 400% during manufacture (obtained in Example A) is immersed in 96% sulfuric acid at 25° C. for 48 hours. The treated skein is then rinsed with water and dried by exposure to the ambient atmosphere. The resulting yarn is insoluble in organic solvents so that it is dry-cleanable. It also is entirely resistant to shrinkage at temperatures up to and including 200° C. so that it can be scoured without risk of shrinkage. As a result of the treatment, the tenacity of the fibers is increased by about 50% and the toughness is increased by about 500%. The fibers contain 0.4 sulfonic acid group per aromatic nucleus in the polymeric mass of which the fibers are constituted and they have an ion-exchange capacity of about 2 milliequivalents per gram weight thereof.

*Example 2*

(a) A skein of a yarn formed of continuous filaments (1,000 denier, 500 filaments) of a blend of 80 parts of polystyrene and 20 parts of polybutadiene which had been stretched about 500% during manufacture is wound on a perforated bobbin of glass and then immersed in a 1.0 molar solution of aluminum chloride is nitromethane at 30° C. for 12 hours. The treated package is then rinsed with water and air-dried. The resulting yarn is insoluble in inorganic solvents and also is entirely resistant to shrinkage at temperatures up to and including 200° C. As a result of the treatment, the toughness is increased by about 300%.

(b) The cross-linked product of part (a) is immersed in 96% (by weight) sulfuric acid at 40° C. for 15 minutes, and thereafter rinsed in water. The product has about 2 sulfonic acid groups per 10 aromatic nuclei in the polymeric mass making up the fibers and it has an ion-exchange capacity of about 1.0 milliequivalent per gram.

*Example 3*

(a) A fabric woven of continuous filament yarn of a blend of 90 parts of polystyrene and 10 parts of polyisoprene is immersed in 96% sulfuric acid at 25° C. for 2 hours. The pretreated fabric is rinsed with water, air-dried, and then immersed in a 0.5 molar solution of aluminum chloride in nitromethane for 10 hours. The treated material is again rinsed and dried. The resulting fabric is resistant to scouring and dry-cleaning.

(b) The fabric obtained in part (a) is suspended 10 minutes at room temperature in a closed container in which liquid sulfur trioxide is vaporized. An exothermic reaction occurs. The treated fabric is rinsed in 96% sulfuric acid to remove excess sulfur trioxide and then rinsed in water. The product obtained has an ion-exchange capacity of about 4.5 milliequivalents per gram.

*Example 4*

(a) A skein of a yarn formed of continuous filaments of a blend comprising 85 parts of polystyrene and 15 parts of poly(vinyl chloride) which has been stretched about 300% during manufacture is immersed in boron trifluoride etherate at 25° C. for 4 hours. The treated skein is rinsed with methanol, then with water, and air-dried. The resulting yarn is cross-linked, insoluble in organic solvents, and stabilized against shrinkage.

(b) The skein obtained in part (a) is treated in chlorosulfonic acid at room temperature for 5 minutes. Thereupon, it is removed, immersed in carbon tetrachloride to remove excess chlorosulfonic acid, rinsed in 96% sulfuric acid, and then immersed in a 10% sodium hydroxide solution in water wherein it is heated to about 75° C. and held about 30 minutes to form the sodium sulfonate of the polymer. It is regenerated to the sulfonic acid form by immersion in dilute (5% to 10%) hydrochloric acid. It has an ion-exchange capacity of about 4.8 milliequivalents per gram.

*Example 5*

(a) A fabric woven of continuous filaments formed of a blend of 80 parts of poly(vinyltoluene) and 20 parts of natural rubber is immersed in a complex of boron trifluoride with phosphoric acid at 50° C. for 24 hours. The treated fabric is rinsed with water and then air-dried. The resulting material is resistant to shrinkage during normal scouring operations at temperatures of 90° to 100° C.

(b) The fabric obtained in part (a) is immersed in fuming sulfuric acid (20% oleum) at 25° C. for 20 minutes. It is then removed, rinsed in 75% sulfuric acid, and finally rinsed in water. It has an ion-exchange capacity of 4.0 milliequivalents per gram.

*Example 6*

The fibers obtained in Example 1 are immersed in 98% sulfuric acid at 50° C. for 24 hours, then removed therefrom, rinsed in 85% sulfuric acid, and then rinsed in water. This product has an ion-exchange capacity of about 5.0 milliequivalents per gram. It can be converted to the sodium form by immersion in 5% sodium hydroxide or carbonate and the latter can be regenerated to the acid form in dilute hydrochloric acid.

It is to be understood that changes and variations may be made without departing from the spirit and scope of the invention as defined in the appended claims.

I claim:

1. As an article of manufacture, an artificial fiber formed from a blend of linear polymers comprising (A) a polymer of at least one monovinyl aromatic compound and (B) a linear polymer of at least one compound selected from the group consisting of alkenyl halides and linear aliphatic polyenes, the blend having an apparent second order transition temperature of at least 20° C., the proportion of units in the polymer blend derived from a member selected from the group consisting of alkenyl halides and polyenes being about 2 to 30% by weight of the blend, the linear polymers in the blend being oriented longitudinally of the axis of the fiber as a result of stretching of the fiber, while the polymers of the blend are still of linear character, at least 50% of the initial length of the fiber, the fiber being in a condition of stabilization wherein it is resistant to shrinkage on heating as a result exclusively of cross-linking by alkylation of aromatic nuclei of (A) above with polymerized units derived from a member selected from the group consisting of alkenyl halides and polyenes in (B) above, said cross-linked fiber containing at least one sulfonic group per 10 aromatic nuclei in the fiber.

2. As an article of manufacture, an artificial fiber formed from a blend of linear polymers comprising (A) a polymer of at least one monovinyl aromatic compound and (B) a linear polymer of butadiene, the blend having an apparent second order transition temperature of at least 20° C., the proportion of units in the polymer blend derived from a linear aliphatic polyene being about 2 to 30% by weight of the blend, the linear polymers in the blend being oriented longitudinally of the axis of the fiber as a result of stretching of the fiber, while the polymers of the blend are still of linear character, at least 50% of the initial length of the fiber, the fiber being in a condition of stabilization wherein it is resistant to shrinkage on heating as a result exclusively of cross-linking by alkylation of aromatic nuclei of (A) above with polymerized butadiene units, said cross-linked fiber containing at least one sulfonic group per 10 aromatic nuclei in the fiber.

3. As an article of manufacture, an artificial fiber formed from a blend of linear polymers comprising (A) a polymer of styrene and (B) a linear polymer of at least one compound selected from the group consisting of alkenyl halides and linear aliphatic polyenes, the blend having an apparent second order transition temperature of at least 20° C., the proportion of units in the polymer blend derived from a member selected from the group consisting of alkenyl halides and polyenes being about 2 to 30% by weight of the blend, the linear polymers in the blend being oriented longitudinally of the axis of the fiber as a result of stretching of the fiber, while the polymers of the blend are still of linear character, at least 50% of the initial length of the fiber, the fiber being in a condition of stabilization wherein it is resistant to shrinkage on heating as a result exclusively of cross-linking by alkylation of aromatic nuclei of (A) above with polymerized units derived from a member selected from the group consisting of alkenyl halides and polyenes in (B) above, said cross-linked fiber containing at least one sulfonic group per 10 aromatic nuclei in the fiber.

4. As an article of manufacture, an artificial fiber formed from a blend of linear polymers comprising (A) a polymer of vinyltoluene and (B) a linear polymer of at least one compound selected from the group consisting of alkenyl halides and linear aliphatic polyenes, the blend having an apparent second order transition temperature of at least 20° C., the proportion of units in the polymer blend derived from a member selected from the group consisting of alkenyl halides and polyenes being about 2 to 30% by weight of the blend, the linear polymers in the blend being oriented longitudinally of the axis of the fiber as a result of stretching of the fiber, while the polymers of the blend are still of linear character, at least 50% of the initial length of the fiber, the fiber being in a condition of stabilization wherein it is resistant to shrinkage on heating as a result exclusively of cross-linking by alkylation of aromatic nuclei of (A) above with polymerized units derived from a member selected from the group consisting of alkenyl halides and polyenes in (B) above, said cross-linked fiber containing at least one sulfonic group per 10 aromatic nuclei in the fiber.

5. As an article of manufacture, an artificial fiber formed from a blend of linear polymers comprising (A) a polymer of at least one monovinyl aromatic compound and (B) a linear polymer of vinyl chloride, the blend having an apparent second order transition temperature of at least 20° C., the proportion of units in the polymer blend derived from an alkenyl halide being about 2 to 30% by weight of the blend, the linear polymers in the blend being oriented longitudinally of the axis of the fiber as a result of stretching of the fiber, while the polymers of the blend are still of linear character, at least 50% of the initial length of the fiber, the fiber being in a condition of stabilization wherein it is resistant to shrinkage on heating as a result exclusively of cross-linking by alkylation of aromatic nuclei of (A) above with polymerized vinyl chloride units, said cross-linked fiber containing at least one sulfonic group per 10 aromatic nuclei in the fiber.

6. As an article of manufacture, an artificial fiber formed from a blend of linear polymers comprising (A) a polymer of styrene and (B) a linear polymer of butadiene, the blend having an apparent second order transition temperature of at least 20° C., the proportion of units in the polymer blend derived from butadiene being about 2 to 30% by weight of the blend, the linear polymers in the blend being oriented longitudinally of the axis of the fiber as a result of stretching of the fiber, while the polymers of the blend are still of linear character, at least 50% of the initial length of the fiber, the fiber being in a condition of stabilization wherein it is resistant to shrinkage on heating as a result exclusively of cross-linking by alkylation of aromatic nuclei of styrene with polymerized units derived from butadiene, said cross-linked fiber containing at least one sulfonic group per 10 aromatic nuclei in the fiber.

7. As an article of manufacture, an artificial fiber formed from a blend of linear polymers comprising (A) a polymer of styrene and (B) a linear polymer of isoprene, the blend having an apparent second order transition temperature of at least 20° C., the proportion of units in the polymer blend derived from isoprene being about 2 to 30% by weight of the blend, the linear polymers in the blend being oriented longitudinally of the axis of the fiber as a result of stretching of the fiber, while the polymers of the blend are still of linear character, at least 50% of the initial length of the fiber, the fiber being in a condition of stabilization wherein it is resistant to shrinkage on heating as a result exclusively of cross-linking by alkylation of aromatic nuclei of styrene with polymerized units derived from isoprene, said cross-linked fiber containing at least one sulfonic group per 10 aromatic nuclei in the fiber.

8. As an article of manufacture, an artificial fiber formed from a blend of linear polymers comprising (A) a polymer of styrene and (B) a linear polymer of vinyl chloride, the blend having an apparent second order transition temperature of at least 20° C., the proportion of units in the polymer blend derived from vinyl chloride being about 2 to 30% by weight of the blend, the linear polymers in the blend being oriented longitudinally of the axis of the fiber as a result of stretching of the fiber, while the polymers of the blend are still of linear character, at least 50% of the initial length of the fiber, the fiber being in a condition of stabilization wherein it is resistant to shrinkage on heating as a result exclusively of cross-linking by alkylation of aromatic nuclei of styrene with polymerized units derived from vinyl chloride, said cross-linked fiber containing at least one sulfonic group per 10 aromatic nuclei in the fiber.

9. As an article of manufacture, an artificial fiber formed from a blend of linear polymers comprising (A) a polymer of vinyltoluene and (B) natural rubber, the blend having an apparent second order transition temperature of at least 20° C., the proportion of units in the polymer blend derived from a linear aliphatic polyene being about 2 to 30% by weight of the blend, the linear polymers in the blend being oriented longitudinally of the axis of the fiber as a result of stretching of the fiber, while the polymers of the blend are still of linear character, at least 50% of the initial length of the fiber, the fiber being in a condition of stabilization wherein it is resistant to shrinkage on heating as a result exclusively of cross-linking by alkylation of aromatic nuclei of vinyltoluene with units of the natural rubber, said cross-linked fiber containing at least one sulfonic group per 10 aromatic nuclei in the fiber.

(References on following page)

References Cited in the file of this patent

UNITED STATES PATENTS

| | | |
|---|---|---|
| 2,170,439 | Wiezevich | Aug. 22, 1939 |
| 2,197,088 | Welker et al. | Apr. 16, 1940 |
| 2,420,565 | Rugeley et al. | May 13, 1947 |
| 2,425,086 | D'Alelio | Aug. 5, 1947 |
| 2,548,853 | Baker | Apr. 17, 1951 |
| 2,603,620 | Walter et al. | July 15, 1952 |
| 2,623,807 | Schappel | Dec. 30, 1952 |
| 2,661,339 | Sparks et al. | Dec. 1, 1953 |
| 2,695,834 | DeNie | Nov. 30, 1954 |
| 2,933,460 | Richter et al. | Apr. 19, 1960 |
| 2,961,290 | Kolb | Nov. 22, 1960 |
| 3,014,776 | Mecco | Dec. 26, 1961 |